US006511736B1

(12) United States Patent
Asano et al.

(10) Patent No.: US 6,511,736 B1
(45) Date of Patent: Jan. 28, 2003

(54) INK JET RECORDING MATERIAL AND PROCESS FOR PRODUCING SAME

(75) Inventors: Shinichi Asano, Tokyo (JP); Shunichiro Mukoyoshi, Ichikawa (JP); Hirokazu Sunagawa, Tokyo (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 09/558,328

(22) Filed: Apr. 26, 2000

(30) Foreign Application Priority Data

Apr. 26, 1999 (JP) .......................................... 11-118038
Nov. 22, 1999 (JP) .......................................... 11-331868

(51) Int. Cl.$^7$ ............................ B32B 27/14; B32B 3/00

(52) U.S. Cl. ....................... 428/195; 428/206; 428/325; 428/423.1

(58) Field of Search ................................ 428/195, 206, 428/304.4, 325, 423.1

(56) References Cited

U.S. PATENT DOCUMENTS

| | | | | |
|---|---|---|---|---|
| 5,275,846 A | | 1/1994 | Imai et al. | |
| 5,478,631 A | * | 12/1995 | Kawano et al. | 428/212 |
| 5,670,242 A | | 9/1997 | Asano et al. | |
| 6,187,430 B1 | * | 2/2001 | Mukoyoshi et al. | 428/331 |

FOREIGN PATENT DOCUMENTS

| | | |
|---|---|---|
| EP | 0 850 777 A2 | 7/1998 |
| EP | 0 878 322 A2 | 11/1998 |
| EP | 0879709 A1 | 11/1998 |
| JP | 07089220 | 4/1995 |
| JP | 08246392 | 9/1996 |

* cited by examiner

*Primary Examiner*—Cynthia H. Kelly
*Assistant Examiner*—B. Shewareged
(74) *Attorney, Agent, or Firm*—Arent Fox Kintner Plotkin & Kahn, PLLC

(57) ABSTRACT

An ink jet recording material having excellent gloss and capable of recording thereon clear ink images having a high color density includes a multi-layered ink fixing layer, formed on a substrate material and composed of an outermost ink fixing layer, and one or more intermediate ink fixing layers superposed on each other, and each includes a binder and a pigment selected from silica, aluminosilicate, alumina and zeolite, the pigment in each ink fixing layer being in the form of fine secondary particles having an average secondary particles size of 1 μm or less and each secondary particle is composed of a plurality of primary particles agglomerated with each other, and the outermost ink fixing layer being one formed by a cast-coating procedure using a specular casting surface.

8 Claims, No Drawings

INK JET RECORDING MATERIAL AND PROCESS FOR PRODUCING SAME

BACKGROUND OF THE INVENTION

1. Field of the Invention

The present invention relates to an ink jet recording material having a high gloss and an excellent ink jet recording property and to a process for producing the same.

2. Description of the Related Art

The recording system using an ink jet printer is advantageous in that the noise level is low, recording can be effected at a high speed, and multi-colored images can be easily formed, and thus it is widely utilized in various fields. As a recording sheet for the ink jet recording system, woodfree paper sheet having an enhanced ink absorption and coated paper sheets having a porous pigment-containing coating layer are used. Almost all of these conventional paper sheets for the ink jet recording system have a low surface gloss and thus are mat paper sheets. Thus, a new type of recording sheet, having a high gloss and a good appearance, has been demanded for the ink jet recording system.

Generally, as a paper sheet having a high gloss, a high gloss coated paper sheet which is produced by coating a surface of a substrate paper sheet with a coating layer containing a plate-crystalline pigment and optionally applying a calender treatment to the coating layer surface, or a cast-coated paper sheet which is produced by bringing a coating layer formed on a substrate paper sheet surface into contact with a specular surface of a heated casting drum while the coating layer is kept in wetted condition, pressing the wetted coating layer onto the specular surface under pressure, and drying the coating layer to cause the specular surface condition of the casting drum to be transferred to the dried coating layer surface, are known.

The cast-coated sheet exhibits a surface gloss and a surface smoothness higher than those of a conventional coated and calender-finished paper sheet, and thus an excellent printing effect can be obtained on the cast-coated sheet. Thus, the cast-coated paper sheet is mainly used for high class printings. When the conventional cast-coated sheets are utilized for the ink jet recording system, various problems occur.

The conventional cast-coated paper sheet disclosed, for example, in U.S. Pat. No. 5,275,846, has a high gloss obtained by transferring a specular surface condition from a specular surface of a cast coater drum to a coating layer comprising a pigment composition containing a film-forming material such as a binder or adhesive. In this transfer, the film-forming material plays an important role. However, the film-forming material causes the porosity of the resultant coating layer to be lost, and thus the ink absorption of the coating layer to be significantly decreased. To improve the ink absorption, it is important that the cast-coated ink fixing layer is porous and thus can easily absorb the ink. The increase in the porosity of the coating layer causes the film-forming property of the coating layer to be decreased. For this purpose, when the content of the film-forming material in the coating layer is decreased, the gloss of the resultant coating layer is decreased.

Accordingly, it is very difficult to simultaneously make the surface gloss and the ink receiving property of the cast-coated recording sheet satisfactory.

The inventors of the present invention have found, as disclosed in Japanese Unexamined Patent Publication No. 7-89,220 that a cast-coated paper sheet useful for ink jet recording and having both a high gloss and an excellent ink absorption can be produced by coating a surface of a paper sheet having a recording layer comprising as principal components, a pigment and a binder with a coating liquid comprising, as a principal component, a copolymer produced by polymerizing ethylenically unsaturated monomers and having a glass transition temperature of 40° C. or more, to form a coating layer for casting; press-contacting the coating layer for casting with a heated specular surface of a casting drum under pressure while the coating layer is kept in wetted condition; and drying the casted coating layer on the specular surface of the casting drum.

Currently, in the ink jet recording system, the recording speed has been increased, the definition and accuracy of the recorded images have been enhanced, and the full colored image printing has been improved and, thus, an ink jet recording material having a high gloss and being capable of recording thereon colored ink images, having a high clarity and a high color density, is in strong demanded. For example, the ink jet recording material is required to have high gloss and recording quality comparable to those of silver salt type photographic printing sheet. However, at the present, it is difficult to fully meet the above-mentioned requirements even when the above-mentioned technology is utilized.

SUMMARY OF THE INVENTION

An object of the present invention is to provide an ink jet recording material having a high gloss and capable of recording thereon ink images with a high clarity and a high color density, and a process for producing the same.

The above-mentioned object can be attained by the ink jet recording material, and the process for producing the same, of the present invention.

The ink jet recording material of the present invention comprises a substrate material and a multi-layered ink fixing layer formed on a surface of the substrate material and composed of an outermost ink fixing layer and one or more intermediate ink fixing layers superposed on each other and each comprising a pigment comprising at least one member selected from the group consisting of silica, aluminosilicate, alumina and zeolite, and a binder, wherein the pigment in each ink fixing layer is in the form of fine secondary particles having an average secondary particle size of 1 μm or less and each secondary particle is composed of a plurality of primary particles agglomerated with each other to form the secondary particle, and the outermost ink fixing layer is one formed by a cast-coating procedure.

The process of the present invention for producing the ink jet recording material comprises coating a surface of a substrate material with a multi-layered ink fixing layer composed of an outermost ink fixing layer and one or more intermediate ink fixing layer superposed on each other and each comprising a pigment comprising at least one member selected from the group consisting of silica, aluminosilicate, alumina and zeolite, and a binder, wherein the pigment for the multi-layered ink fixing layer is in the form of fine secondary particles having an average secondary particle size of 1 μm or less and each secondary particle is composed of a plurality of primary particles agglomerated with each other to form the secondary particle, and the outermost ink fixing layer of the multi-layered ink fixing layer is formed by a cast-coating procedure wherein a layer of a coating composition for the outermost ink fixing layer is brought into contact with a heated specular surface of a casting drum under pressure, while the coating composition layer is kept in a wetted condition, and drying the coating composition layer pressed on the heated specular surface of the casting drum.

In the ink jet recording material of the present invention the pigment contained in each ink fixing layer is preferably silica.

In the ink jet recording material of the present invention, at least one undercoat layer comprising a pigment and a binder is optionally formed between the substrate material and the multi-layered ink fixing layer.

In the ink jet recording material of the present invention, a cationic compound having one or more cationic groups per molecule is optionally further contained in at least the outermost ink fixing layer of the multi-layered ink fixing layer.

In the ink jet recording material of the present invention, preferably, the cast-coating procedure for forming the outermost ink fixing layer is carried out by bringing a layer of a coating composition for the outermost ink fixing layer into contact with a heated specular surface of a casting drum under pressure, while the coating composition layer is kept in a wetted condition, and drying the coating composition layer on the heated specular surface of the casting drum.

In the ink jet recording material of the present invention, preferably, the pigment in the multi-layered ink fixing layer is in the form of secondary particles having an average secondary particle size of 10 to 500 nm and each secondary particle is composed of a plurality of primary particles having an average primary particle size of 3 to 40 nm and agglomerated with each other to form the secondary particle.

In the ink jet recording material of the present invention, preferably, the multi-layered ink fixing layer comprises an outermost ink fixing layer and an intermediate ink fixing layer located between the substrate material and the outermost ink fixing layer, and the outermost and intermediate ink fixing layers respectively contain a cationic compound having one or more cationic groups per molecule in an amount such that the intermediate ink fixing layer has a total content indicated in the units of milli equivalent, of the cationic groups, of 50% or less of the total content indicated in the units of milli equivalent, of the cationic groups contained in the outermost ink fixing layer.

In the ink jet recording material of the present invention, the multi-layered ink fixing layer may comprise an outermost ink fixing layer and an intermediate ink fixing layer located between the substrate material and the outermost ink fixing layer, and the outermost ink fixing layer may contain a cationic compound, and the intermediate ink fixing layer may not contain a cationic compound.

In the ink jet recording material of the present invention, preferably, the undercoat layer contains a cationic compound having one or more cationic groups per molecule, and the total content, in the units of milli equivalent, of the cationic groups in the undercoat layer, is 50% or less of the total content, in the units of milli equivalent, of the cationic groups in the outermost ink fixing layer.

In the ink jet recording material of the present invention, the surface of the outermost ink fixing layer preferably has a gloss at a specular angle of 75 degrees of 30% or more, determined in accordance with JIS P 8142.

In the ink jet recording material of the present invention, the undercoat layer may not contain a cationic compound and at least the outermost ink fixing layer in the multi-layered ink fixing layer may contain a cationic compound.

In the ink jet recording material of the present invention, the pigment for the undercoat layer preferably comprises at least one member selected from the group consisting of amorphous silica, alumina and zeolite.

In the ink jet recording material of the present invention, the pigment for the undercoat layer is preferably in the form of secondary particles having a secondary particle size of 1 to 20 $\mu$m.

In the ink jet recording material of the present invention, the undercoat layer optionally further comprises a complex of polymer of at least one monomer having at least one ethylenically unsaturated bond with colloidal silica.

In the ink jet recording material of the present invention, in the multi-layered ink fixing layer, the binder and the pigment are preferably present in a weight ratio of 5:100 to 100:100.

In the ink jet recording material of the present invention, in the multi-layered ink fixing layer, the outermost ink fixing layer may contain the binder in a higher proportion, based on the amount of the pigment, than that in the intermediate ink fixing layers.

In the ink jet recording material of the present invention, the binder for the multi-layered ink fixing layer preferably comprises a polyurethane resin.

In the ink jet recording material of the present invention, the polyurethane resin is preferably a cationic polyurethane resin.

In the ink jet recording material of the present invention, the binder for the outermost ink fixing layer preferably contains a polymeric material having a glass transition temperature of −20° C. or more.

The process of the present invention, for producing an ink jet recording material, comprises coating a surface of a substrate material with a multi-layered ink fixing layer composed of an outermost ink fixing layer and one or more intermediate ink fixing layers superposed on each other and each comprising a pigment comprising at least one member selected from the group consisting of silica, aluminosilicate, alumina and zeolite, and a binder, wherein the pigment for the multi-layered ink fixing layer is in the form of fine secondary particles having an average secondary particle size of 1 $\mu$m or less and each secondary particle is composed of a plurality of primary particles agglomerated with each other to form a secondary particle, and the outermost ink fixing layer is formed by a cast-coating procedure wherein a layer of a coating composition for the outermost ink fixing layer is brought into contact with a heated specular surface of a casting drum under pressure, while the coating composition layer is kept in a wetted condition, and drying the coating composition layer pressed on the heated specular surface of the casting drum.

DESCRIPTION OF THE PREFERRED EMBODIMENTS

The substrate material usable for the ink jet recording material of the present invention is not limited to a specific type of materials, and can be selected from paper sheets including acidic paper sheets and neutralized paper sheets which are usable for the usual coated paper sheets, and air-permeable plastic resin sheets.

The paper sheets usable for the substrate material comprise, as principal components, a wood pulp and optionally a pigment. The wood pulp may be selected from various chemical pulps, mechanical pulps and regenerated pulps.

The freeness of the wood pulp can be adjusted by a beating (pulping) machine, to control the paper strength and the paper-forming property. There is no limitation to the freeness of the pulp for the substrate material. Usually, the pulp has a freeness (Canadian Standard Freeness, CSF) of 250 to 550 ml, determined in accordance with JIS P 8121. To reduce a damage to gears for transporting the recording sheet in the printer, the degree of beating the pulp for the substrate material is preferably increased, and thus the Canadian Standard Freeness (CSF) of the pulp is preferably decreased. However, when the substrate material is produced from a pulp having a relatively high CSF, and the resultant recording material is printed with an aqueous ink in an ink jet recording system, the recording material usually exhibits a high resistance to cockle due to local absorption with the aqueous ink and to blotting of the printed ink images. The freeness of the pulp is preferably in the range of from about 300 to about 500 ml. The pigment is contained in the paper sheet for the substrate material for the purpose of imparting a desired opaqueness to the paper sheet or of controlling the ink absorption of the paper sheet to a desired level. The pigment preferably comprises calcium carbonate, calcined kaolin, silica, zeolite and/or titanium dioxide. Particularly, the calcined kaolin, silica and zeolite exhibit a high absorption of the solvent contained in the ink, and thus are advantageously employed in the paper sheet for the substrate material. In this case, the pigment is preferably contained in a content of 1 to 20% by weight in the paper sheet. If the content of the pigment is too high, the resultant paper sheet may exhibit a decreased paper strength, and may damage the recording sheet-transporting gears mentioned above. Thus, the paper sheet for the substrate material preferably has an ash content of 3 to 15% by weight. The paper sheet for the substrate material optionally further comprises an additive comprising at least one member selected from, for example, sizing agents, ink-fixing agent, paper strength agents, cationic agents, retention aids, dyes, and fluorescent brightening agents. Further, in a size-press procedure in a paper-forming machine, the paper sheet for the substrate material may be coated or impregnated with starch, polyvinyl alcohol, or a derivative thereof or a cationic resin, to control the surface strength and/or sizing degree of the paper sheet. The sizing degree of the paper sheet is preferably 1 to 200 seconds when the basis weight of the paper sheet is 100 g/$m^2$. When the sizing degree is too low, the resultant paper sheet may exhibit a low resistance to wrinkling during a coating procedure and may cause an operational difficulty. When the sizing degree is too high, the. resultant paper sheet may exhibit an unsatisfactory ink absorption and a poor resistance to curling and/or cockling due to ink jet printing. More preferably, the sizing degree is in the range of from 4 to 120 seconds. There is no limitation to the basis weight of the substrate material. The substrate material preferably has a basis weight of about 20 to 400 g/$m^2$.

In the ink jet recording material of the present invention, a multi-layered ink fixing layer is formed on a substrate material surface. To enhance the ink absorption capacity and ink absorbing rate of the ink jet recording material, preferably an undercoat layer is formed between the substrate material and the multi-layered ink fixing layer.

The multi-layered ink fixing layer refers to a coating layer mainly for fixing therein a coloring material, namely a coloring dye or coloring pigment contained in the ink for the ink jet recording, and the undercoat layer refers to a coating layer mainly for rapidly absorbing the liquid medium contained in the ink. However, the roles of the multi-layered ink fixing layer and the undercoat layer are not always clearly distinguished from each other. For example, where the amount of the ink applied is small, the coloring material of the ink may be fixed only in an outermost ink fixing layer of the multi-layered ink fixing layer (namely, a surface layer or gloss layer located outermost of the multi-layered ink fixing layer); where the amount of the applied ink is large, the coloring material may be fixed not only in the outermost ink fixing layer but also in the intermediate ink fixing layer or layers located between the outermost ink fixing layer and the undercoat layer; and where the amount of the applied ink is very large, a portion of the coloring material in the ink may be fixed in the undercoat layer and further in the substrate material.

The undercoat layer formed on the substrate material comprises as principal components, a pigment and a binder. The pigment to be contained in the undercoat layer comprises at least one member selected from inorganic pigments, for example, kaolin, clay, calcined clay, non-crystalline silica (namely amorphous silica), synthetic non-crystalline silica, zinc oxide, aluminum oxide, aluminum hydroxide, calcium carbonate, satin white, aluminum silicate, alumina, colloidal silica, zeolite, synthetic zeolite, sepiolite, smectites, synthetic smectites, magnesium silicate, magnesium carbonate, magnesium oxide, diatomaceus earth and hydrotalcite; and synthetic resin pigments, for example, styrene polymers, urea resins, and benzoguanamine resins; which are conventional pigments for coated paper sheet production. Among the above-mentioned pigments, amorphous silica, alumina and zeolite are preferably employed as principal components of the pigment for the undercoat layer, because they have a high ink absorption.

The pigment particles usable as a principal component of the pigment for the undercoat layer preferably have an average particle size (when the individual particles are secondary particles each composed of a plurality of primary particles agglomerated with each other, an average secondary (agglomerate) particle size), of about 1 to 20 $\mu$m, more preferably 2 to 10 $\mu$m, still more preferably 3 to 8 $\mu$m. When the average particle size is less than 1 $\mu$m, the ink absorbing rate-enhancing effect of the pigment on the substrate material may be unsatisfactory. When the average particle size is more than 20 $\mu$m, the resultant cast-coated layer formed on the undercoat layer may exhibit unsatisfactory smoothness and gloss.

However, the substrate material optionally contains, as an additional component, a pigment having a small particle size for the purpose of controlling the ink-absorbing property of the undercoat layer and of restricting a penetration of a coating composition applied onto the undercoat layer into the undercoat layer. As the pigment usable for the above-mentioned purpose, colloidal silica, alumina sol or fine silica particles to be contained in the multi-layered ink fixing layer which will be explained hereinafter.

The binder for the undercoat layer preferably contains at least one member selected from proteins, for example, casein, soybean protein and synthetic proteins; starch and various derivatives thereof, for example, oxidized starches; polyvinyl alcohol and modified polyvinyl alcohols, for example, cation-modified polyvinyl alcohols and silyl-modified polyvinyl alcohols; cellulose derivatives, for example, carboxymethylcellulose and methylcellulose; latices of conjugated diene polymers, for example, styrene-butadiene copolymers and methyl methacrylate-butadiene copolymers; and latices of vinyl polymers, for example, arylic polymers and copolymers and ethylene-vinyl acetate copolymers, which are widely known as binders for conventional coated paper sheets. These binder compounds may be used alone or in a combination of two or more thereof.

The mixing ratio of the pigment and the binder is variable in response to the types thereof. Usually, the binder is preferably employed in an amount of 1 to 100 parts by weight, more preferably 2 to 50 parts by weight, per 100 parts by weight of the pigment. The undercoat layer optionally contains one or more additives selected from, for example, dispersing agents, thickening agents, anti-foam agents, anti-static agents and preservatives. The undercoat layer may contain a fluorescent brightening agent and/or a coloring material.

In the undercoat layer, a cationic compound is optionally contained for the purpose of fixing the coloring material (dye or coloring pigment) in the ink for the ink jet recording. In this case, however, the coloring material in the ink is preferably fixed in a portion of the recording material as close as possible to the recording surface of the recording material to cause the color density of the recorded images to be high. This feature will be explained hereinafter. For this purpose, the cationic compound is preferably contained in a larger content in the multi-layered ink fixing layer, particularly in the outermost ink fixing layer (a gloss layer), than that in the undercoat layer. Preferably, the content of cationic compound in the undercoat layer is 50% or less, more preferably 20% or less, of that in the outermost ink fixing layer.

More preferably, the cationic component is contained only in the multi-layered ink fixing layer, particularly in the outermost ink fixing layer but substantially not in the undercoat layer. The undercoat layer substantially not containing the cationic compound is allowed to contain a cationic surfactant, as an auxiliary, in a small amount. In the case where the cationic compound is contained in the multi-layered ink fixing layer, particular in the outermost ink fixing layer but substantially not in the undercoat layer, the cast-coated outermost ink fixing layer exhibits an extremely excellent gloss.

Preferably, the content of the cationic compound in the intermediate ink fixing layer or layers located between the outermost ink,fixing layer and the undercoat layer is preferably lower than that in the outermost ink fixing layer, more preferably 50% or less, still more preferably 20% or less, of that in the outermost ink fixing layer. The intermediate ink fixing layer or layers may contain substantially no cationic compound.

When the cationic compound is contained only in the outermost ink fixing layer and the undercoat layer and the intermediate ink fixing layer (or layers) are substantially free from the cationic agent, the resultant outermost ink fixing layer exhibits an extremely excellent gloss. Also, since the coloring material in the ink is preferentially fixed in the outermost ink fixing layer, the resultant recorded images have a high color density. Further, since the pigment particles in the ink fixing layer (or layers) have a particle size of 1 $\mu$m or less and exhibit a high transparency, the images fixed in the outermost ink fixing layer exhibit an enhanced color density.

A term "cation amount" refers to a total amount of cationic groups of the cationic compound contained in each layer of the ink jet recording material. Namely, the cation amount is the product of an amount of the cationic compound contained in each layer and having one or more cationic groups per molecule thereof with the cation intensity of the cationic compound. The cation intensity refers to the milli equivalent of the cation groups per g of the cationic compound and can be determined by a colloid titration method or a flow electric potential method. In the flow electric potential method, the difference in measurement result between individual operators is small and thus this method is preferably used for the cation intensity measurement. The cation intensity is represented in the units of milli equivalent/g, and thus the cation amount is represented in the units of milli equivalent per layer.

To enhance the gloss of the ink jet recording material, a colloidal silica, or a polymer resin prepared by polymerizing at least one monomer having at least ethylenically unsaturated bond, or a complex of colloidal silica with a polymer resin produced by polymerizing at least one monomer having at least one ethylenically unsaturated bond, may be contained in the undercoat layer. The reasons for the enhancement in the gloss is not completely clear. It is assumed that the presence of the above-mentioned polymer resin or complex in the undercoat layer causes the penetration of a coating composition for the multi-layered ink fixing layer applied onto the undercoat layer into the undercoat layer to be prevented or restricted, while the ink absorbing property of the undercoat layer is kept unchanged. Also, it is found that when the outermost ink fixing layer is formed by a cast-coating method using a casting drum, the presence of the polymer or the complex in the undercoat layer contributes to enhancing the release property of the resultant cast-coated layer from the casting drum, but the reasons for enhancement are not clear.

The polymer resins produced by polymerizing the monomers having the ethylenically unsaturated bonds include polymers produced by polymerizing at least one ethylenically unsaturated monomer selected from acrylate esters having an alkyl group, a hydroxyalkyl or an epoxidized alkyl with 1 to 18 carbon atoms, for example, methyl acrylate, ethyl acrylate, butyl acrylate, 2-ethylhexyl acrylate, lauryl acrylate, 2-hydroxyethyl acrylate, and glycidyl acrylate; methacrylate esters having an alkyl, a hydroxyalkyl or epoxidized alkyl group with 1 to 18 carbon atoms, for example, methyl methacrylate, ethyl methacrylate, 2-hydroxyethyl methacrylate, 2-hydroxypropyl methacrylate and glycidyl methacrylate; and styrene, a-methylstyrene, vinyl toluene, vinyl chloride, vinylidene chloride, vinyl acetate, vinyl propionate, acrylic amide, N-methyl acrylic amide, ethylene and butadiene.

The polymers may be selected from copolymers of two or more ethylenically unsaturated comonomers, or substitution derivatives of the polymers and copolymers mentioned above. The substitution derivatives of the polymers and copolymers include carboxylated and alkali-reactive modified polymers and copolymers.

The complex of the colloidal silica with the polymer can be produced by polymerizing the ethylenically unsaturated monomer or monomers in the presence of a silane coupling agent and a colloidal silica to form a Si—O—R bond (R represents the polymer component) through which the polymer molecules are bonded with the colloidal silica particles. Alternatively, the polymer/silica complex is produced by reacting a polymer modified with a silanol group with the colloidal silica to form a Si—O—R bond (R is as defined above) through which the polymer molecules are bonded with the colloidal silica particles.

In the polymer/silica complex, the polymer component preferably has a glass transition temperature (Tg) of 40° C. or more, more preferably 50 to 100° C. When the Tg is too low, the resultant undercoat layer may exhibit a reduced ink-absorbing rate and the ink received in the ink fixing layer may be blotted, probably due to the phenomenon that the resultant polymer/silica complex causes the dried undercoat layer to have too dense a film structure. When the Tg of the polymer/silica complex is more than 40° C., the outermost ink fixing layer formed by the cast-coating procedure may exhibit an enhanced release property from the casting drum.

Preferably, the coating composition for the undercoat layer comprising the above-mentioned components is prepared in a solid content of about 5 to 50% by weight and is coated in a dry solid amount of 2 to 100 $g/m^2$, more preferably 5 to 50 $g/m^2$, still more preferably 10 to 20 $g/m^2$, on a surface of the substrate material. When the amount of the undercoat layer is too small, the enhancement effect on the ink absorption property of the undercoat layer may be insufficient and the outermost ink fixing layer of the multi-layered ink fixing layer formed on the undercoat layer may exhibit an unsatisfactory gloss. When the amount of the undercoat layer is too large, the color density of the ink images may be decreased and the coating layers formed on the substrate material may exhibit a poor mechanical strength and thus may exhibit a powder-forming phenomenon and a poor resistance to mechanical damage. The coating composition for the undercoat layer can be coated on the substrate material by a conventional coating apparatus, for example, a blade coater, an air knife coater, a roll coater, a brush coater, a champlex coater, a bar coater, a lip coater, a gravure coater, a curtain coater, a slot die coater or a slide coater, and dried. Optionally, the dried undercoat layer is subjected to a smoothing treatment by a super calender, or by brushing.

In the ink jet recording material of the present invention, the substrate material or the undercoat layer formed on the substrate material is coated with a multi-layered ink fixing layer comprising at least two ink fixing layers superposed on each other, namely an outermost ink fixing layer located outermost of the ink jet recording material and at least one intermediate ink fixing layer located between the outermost ink fixing layer and the substrate material or the undercoat layer. The multi-layered ink fixing layer contains a binder and a pigment comprising at least one member selected from the group consisting of silica, aluminosilicate, alumina and zeolite, which are in the form of fine secondary particles having an average secondary particle size of 1 μm or less and each secondary particle is composed of a plurality of primary particles agglomerated with each other to form a secondary particle.

The pigment preferably comprises silica and/or aluminosilicate, more preferably silica. The pigments contained in the outermost ink fixing layer and the intermediate ink fixing layer or layers may be different from each other.

In the ink jet recording material of the present invention, at least one intermediate ink fixing layer arranged between the outermost ink fixing layer and the undercoat layer or the substrate layer contributes to enhancing the uniform absorption of the ink by the multi-layered ink fixing layer, the reduction in ink-blotting, and to forming uniform colored images with a high clarity and free from uneven color density.

The secondary particles of the pigment contributes to enhancing the uniform ink absorption of the multi-colored ink fixing layer.

The secondary particles of the pigment have an average secondary particle size of 1 μm or less, preferably 800 nm or less, more preferably 10 to 500 nm, still more preferably 10 to 300 nm, further preferably 15 to 150 nm, still further preferably 20 to 100 nm.

Preferably, the primary particles of the pigment, from which the secondary particles are formed, have an average primary particle size of 3 nm or more but not more than 40 nm, more preferably 5 to 30 nm, still more preferably 7 to 20 nm.

Since the particle size of the pigment is small, the resultant outermost and intermediate ink fixing layers exhibit a high transparency and thus fix therein ink images having a very high color density.

As an example of the pigment for the multi-layered ink fixing layer, the fine silica particles will be explained below.

There is no limitation to the preparation method of the fine particles of pigment, for example, silica, etc., for the each of the ink fixing layers. For example, the fine silica particles can be produced by imparting a strong shearing force to particles of synthetic amorphous silica, which are generally available in trade and having a secondary particle size of several μm, by mechanical means, to pulverize the particles and to reduce the size of the particles. As the mechanical pulverizing means, an ultrasonic homogenizer, a presser type homogenizer, a high speed rotation mill, a roller mill, a container-driving catalyst mill, a catalyst stirring mill, a jet mill or a sand grinder is employed. The pulverized fine silica particles is usually obtained in the state of an aqueous dispersion (slurry or colloidal solution) having a solid content of 5 to 20% by weight.

In the present invention, the average particle size of the pigment particles is determined by an electron microscopic measurement using a SEM or a TEM. In this measurement, an electron microscopic photograph of the pigment particles is taken at a magnification of 10,000 to 400,000; in the photograph, the martin size of the particles located in an area of 5 cm×5 cm is measured, and the data is averaged. This measurement method is disclosed in "FINE PARTICLE HANDBOOK", ASAKURA SHOTEN, page 52, 1991.

The fine pigment particles, for example, fine silica particles, usable for the multi-layered ink fixing layer have an average secondary particle size controlled to 1 μm or less, preferably 800 nm or less, more preferably 10 to 500 nm, still more preferably 10 to 300 nm, further preferably 15 to 150 nm, still further preferably 20 to 100 nm. When the average secondary particle size of the fine silica particles is more than 1 μm, the resultant multi-layered ink fixing layer exhibit an unsatisfactory transparency to cause the color density of the images formed by the coloring material of the ink and fixed in the multi-layered ink fixing layer to be reduced, and thus the fixed images do not exhibit a desired color density. Also, when fine silica particles have a very small average secondary particle size, for example less than 10 nm, the resultant multi-layered ink fixing layer may exhibit an unsatisfactory ink absorbing property, the received ink images may be blotted, and thus the resultant ink images fixed in on the multi-layered ink fixing layer may be unsatisfactory in clarity and color density thereof.

In the fine pigment (silica) particles usable for the multi-layered ink fixing layer, the primary particles, from which the secondary particles are constituted, preferably have an average primary particle size controlled to 3 nm or more but not more than 40 nm, more preferably 5 to 30 nm, still more preferably 7 to 2.0 nm. When the average primary particle size is less than 3 nm, in the resultant secondary particles, the size of empty spaces formed between the primary particles may become very small, and thus the absorption capacity of the pigment secondary particles for the coloring material and the medium (solvent) of the ink may be reduced, and the resultant. ink images fixed in the multi-layered ink fixing layer may exhibit an unsatisfactory quality. Also, when the average primary particle size of the fine pigment (silica) particles is more than 40 nm, the resultant secondary particles of the pigment (silica) may have too large a secondary particle size, the resultant multi-layered ink fixing layer may exhibit an unsatisfactory transparency, the images of the coloring material of the ink fixed in the multi-layered ink fixing layer may exhibit an unsatisfactory color density and thus the resultant fixed ink images may be unsatisfactory in clarity and color density.

In each of the outermost and intermediate ink fixing layers in the multi-layered ink fixing layer, the fine pigment (silica) particles having the average secondary particle size of 1 μm or less are preferably present in an amount of 50% by weight or more based the total weight of the pigment contained the multi-layered ink fixing layer. When the content of the fine pigment particles in all the pigment is less than 50% by weight, the resultant multi-layered ink fixing layer may exhibit an unsatisfactory transparency, and thus the quality of the ink images fixed therein may be unsatisfactory.

The binder usable for the multi-layered ink fixing layer preferably comprises at least one member selected from water-soluble polymeric materials, for example, polyvinyl alcohol, modified polyvinyl alcohols, for example, cation-modified polyvinyl alcohols and silyl-modified polyvinyl-alcohol, casein, soybean protein, synthetic proteins, starch, modified starches, for example, oxidized starch, and cellulose derivatives, for example, carboxymethylcellulose and methylcellulose; and water-insoluble polymeric materials, for example, latices of conjugated diene copolymers, for example, styrene-butadiene copolymers and methyl methacrylate-butadiene copolymers, latices of vinyl polymers, for example, styrene-vinyl acetate copolymers water-dispersible acrylic resins, water-dispersible poly-methane resins, water-dispersible polyester resins and others, which are well known as binders for coated paper production. These binders can be used alone or in a combination of two or more thereof.

The water-dispersible polyurethane resins include a urethane emulsion, a urethane latex and a polyurethane latex. The polyurethane resin is a polymeric compound produced by a reaction of a polyisocyanate compound with an activated hydrogen atom-containing compound, and contains a relatively large number of urethane bonds and urea bonds per molecule.

There is no limitation to the polyisocyanate compounds usable for the polyurethane resin. The polyisocyanate compound is preferably selected from aromatic polyisocynanates, for example, trilenediisocyanate and 4,4'-diphenylmethanediisocyanate, and aliphatic and cycloaliphatic polyisocyanates, for example, hexamethylene diisocyanate and isophoronediisocyanate.

The activated hydrogen atom-containing compounds for producing the polyurethane resins are generally selected from organic compounds having a hydroxyl group and/or an amino group. These compounds may be polymeric or monomeric. The polymeric activated hydrogen atom-containing compounds include, for example, polyesterdiols, polyetherdiols and polycarbonatediols. The monomeric activated hydrogen atom-containing compounds include glycol compounds, for example, ethylene glycol, 1,4-butanediol, and 1,6-hexanediol, and diamine compounds, for example, isopropyldiamine and hexamethylenediamine.

The polyurethane resins dispersed or emulsified in the form of fine particles in an aqueous medium will be referred to as aqueous polyurethane resins hereinafter. In the aqueous dispersion or emulsion, the particles of the polyurethane resins preferably have a particle size of 0.001 to 20 μm. In this case, the aqueous dispersion or emulsion appears as a clear aqueous solution, a semi-transparent colloidal dispersion or a milky white emulsion. The aqueous polyurethane resins are classified into three classes, namely compulsorily emulsified resins prepared by compulsorily emulsifying the polyurethane resins in the presence of an emulsifying agent by a high mechanical shearing force, self-emulsified resins having hydrophilic groups, for example, ionic groups introduced into the molecular chains of the resins and exhibiting an enhanced hydrophilic property, and self-emulsifiable in the presence of no emulsifying agent in water with a high storage stability, and water-soluble resins which are soluble in water. Among these types of aqueous polyurethane resins, the self-emulsifiable aqueous polyurethane resins having a high gloss-providing property and a high water resistance are preferably employed for the multi-layered ink-fixing layer of the present invention. The self-emulsifiable aqueous polyurethane resins are classified, in response to the type of the hydrophilic groups introduced into the molecular chains thereof, into three types, namely, cationic resins (having, for example, amino groups), anionic resins (having, for example, carboxyl groups and/or sulfon groups) and non-ionic resins (having, for example, polyethyleneglycol groups.) Among these aqueous polyurethane resins usable for the outermost ink fixing layer, cationic aqueous polyurethane resins having tertiary amine groups introduced into the molecular chains of the resins and neutralized with acid or changed to quaternary ammonium salt groups, are preferably used. When the aqueous polyurethane resins are cationic, the resultant casted outermost ink fixing layer exhibits an excellent ink-absorbing property and the resultant ink images fixed thereon exhibit an excellent color density. Also, when the cationic compound is contained as an aqueous ink fixing agent in the cast-coated outermost ink fixing layer, the aqueous polyurethane resin exhibits a high compatibility with the cationic compound.

When the cationic compound is contained in each of the individual ink fixing layers, the binder is preferably selected from cationic binders and nonionic binders which causes the resultant coating composition for the ink fixing layers to exhibit a high storage stability. The binder is preferably contained in an amount of 1 to 200 parts by weight, more preferably 5 to 100 parts by weight per 100 parts by weight of the pigment. When the content of the binder is too small, the resultant individual ink fixing layer may exhibit an unsatisfactory mechanical strength, the surface of the outermost ink fixing layer may have a low resistance to mechanical damage, and a powder-forming phenomenon may occur on the resultant outermost ink fixing layer. When the content of the binder is too high, the resultant individual ink fixing layers may have an insufficient ink absorbing property, and thus may exhibit an unsatisfactory ink jet recording performance.

Particularly, when the content of the binder (per 100 parts by weight of the pigment) in the outermost ink fixing layer is adjusted to a level higher than that in the intermediate ink fixing layer or layers, the resultant outermost ink fixing layer may exhibit a good balance between the surface strength and the ink absorbing property thereof.

Generally, the resin usable as a binder for the cast-coated outermost ink fixing layer preferably has a glass transition temperature of −20° C. or more, more preferably 40° C. or more. This binder resin contributes to enhancing the release property of the resultant cast-coated layer from the casting surface of the casting drum and the ink absorbing property of the cast-coated layer for the ink of the ink jet printing system. Still more preferably, the glass transition temperature of the resin is 60° C. or more. There is no upper limit for the glass transition temperature of the binder resin. Usually, the transition temperature of the binder resin is preferably not more than 150° C. When the glass transition temperature is more than 150° C., the resultant cast-coated layer exhibits a further enhanced release property from the casting drum surface and a further increased ink absorbing property, but the resultant cast-coated may exhibit a reduced gloss, an increased brittleness and a decreased mechanical strength and thus when the resultant ink jet recording material is cut or folded, a large amount of dust may be generated from the recording material or portions of the cast-coated outermost ink fixing layer of the recording material may be lost. Therefore, use of a combination of two binder resins different in glass transition temperature from each other in response to the required properties is usually advantageous. The reasons for this advantage is not clear. It is assumed that when a binder resin having a binder glass transition temperature is mixed with a binder resin having a lower glass transition temperature, they do not form a uniform mixture structure and form an "islands in a sea" structure in which one of the resins are dispersed in the form of small islands in a sea (matrix) composed of another one of the resins, and the islands-in-a sea structure of the resin mixture contributes to enhancing the binder resins to exhibit the characteristic properties thereof. When two or more binder resins are used in a mixture thereof, at least one of them preferably has a glass transition temperature of −20° C. or more. Among various types of binder resins, preferably polyetherpolyurethane resins and polyesterpolyurethane resins are employed as a binder for the outermost ink fixing layer.

Since the coloring material contained in the ink for the ink jet printing is usually anionic, the outermost ink fixing layer preferably contains a cationic compound to fix the coloring material in the ink. For this purpose, the cationic compound is used in a mixture with the fine particles of a pigment such as silica. When the fine pigment particles. are fine silica particles, the silica particles are usually anionic and thus when mixed with the cationic compound, the resultant mixture may be coagulated. In this case, in a uniform mixing method, when amorphous silica particles available in the trade and having a secondary particle size of several μm are pulverized and dispersed by applying a strong mechanical shearing force to the particles, the cationic compound is mixed with the amorphous silica particles and they are dispersed together before the pulverizing procedure, and then the mixture is subjected to the pulverizing procedure using mechanical pulverizing means or in another mixing method, the cationic compound is mixed with the finely pulverized silica secondary particles to cause the resultant mixture to be thickened and coagulated, and then the coagulated mixture is mechanically pulverized and dispersed to control the particle size to a desired value.

In the resultant pigment prepared by the above-mentioned methods, a portion of the cationic compound is bonded to the pigment particles, and the resultant particles can be dispersed in an aqueous medium with a high stability. Therefore, even when a cationic compound is further added, the resultant aqueous slurry exhibits a high resistance to coagulation.

The cationic compounds usable for the present invention include, for example, cationic resins and monomeric cationic compounds, for example, cationic surfactants. To enhance the color density of the ink images fixed in the multi-layered ink fixing layer, preferably the cationic resins are employed in the state of an aqueous solution or emulsion. The cationic resins are optionally modified with a cross-linking agent into water-insoluble cationic organic pigment particles. The cross-linked cationic organic pigment particles can be prepared by copolymerizing the cationic resin with a poly-functional cross-linking monomer or by modifying a cationic resin having reactive functional groups, for example, hydroxyl, carboxyl, amino and/or acetoacetyl group by means of heat or radiation optionally in the presence of a cross-linking agent.

In some cases, the cationic compounds, particularly the cationic resins, serve as a binder.

The cationic resins include, for example, (1) polyalkylenepolyamines for example, polyethylenepolyamine and polypropylenepolyamine and derivatives thereof;

(2) acrylic resins having a secondary amino group, a tertiary amino groups and/or a quaternary ammonium group;

(3) polyvinyl amines and polyvinyl amidines;

(4) cationic dicyan resins, typically dicyandiamide-formaldehyde poly-condensation products;

(5) cationic polyamine resins, typically dicyandramide-diethylenetriamine poly-condensation products;

(6) epichlorohydrin-dimethylamine addition-polymerization products;

(7) dimethyldiallylammonium chloride-$SO_2$ copolymerization products;

(8) diallyldramine salt-$SO_2$ copolymerization products;

(9) dimethyldiallylammonium chloride-polymerization products;

(10) allylamine salt-polymerization products;

(11) dialkylaminoethyl(meth)acrylate quaternary salt-polymerization products; and

(12) acrylamide-diallylamine salt copolymerization products.

The cationic compounds contribute to enhancing the resistance of the fixed ink images to water. In each individual ink fixing layer, the cationic compound is preferably contained in an amount of 1 to 100 parts by weight, more preferably 5 to 50 parts by weight per 100 parts by weight of the pigment. When the content of the cationic compound is too low, the resultant color density-enhancing effect for the ink images may be insufficient. When the cationic compound content is too high, the resultant ink images may exhibit an unsatisfactory color density and a poor resistance to blotting and may be uneven. In most cases, the desired effect of the cationic compound can be obtained by containing the cationic compound in at least the outermost ink fixing layer of the multi-layered ink fixing layer. However, when the amount of the ink applied to the recording material is large or the amount of the outermost ink fixing layer is small, the cationic compound is preferably contained in at least one of the intermediate ink fixing layers, in addition to the outermost ink fixing layer.

The cationic compounds include those having a specifically high effect on the enhancement of the color density of the fixed ink images and those exhibiting a high effect on the enhancement of the water resistance, and thus should be selected in response to the specific properties thereof and in view of the purpose of use. The cationic compounds may be employed alone or in a combination of two or more thereof.

When the intermediate ink fixing layer is formed on the substrate material or the undercoat layer, a conventional coating device, for example, a blade coater, air knife coater, a roll coater, a brush coater, a champlex coater, a bar coater, a lip coater, a gravure coater, a curtain coater, a slot die coater or a slide coater, can be employed.

The total dry solid amount of the intermediate ink fixing layers other than the outermost ink fixing layer is preferably 1 to 50 g/$m^2$, more preferably 1.5 to 30 g/$m^2$. When the coating amount is less than 1 g/$m^2$, the ink images may be blotted in the ink jet recording procedure, and when it is more than 50 g/$m^2$, the resultant fixed ink images may have an insufficient color density. When the intermediate ink fixing layers are formed on the undercoat layer, the resultant intermediate ink fixing layer may be the sufficient even in a total amount of about 1 to 10 g/$m^2$.

When the same coating composition as that for the outermost is coated to form the intermediate ink fixing layer, a conventional coating device, for example, a blade coater, air knife coater, a roll coater, a brush coater, a champlex coater, a bar coater, a lip coater, a gravure coater, a curtain coater, a slot die coater or a slide coater, can be employed.

In the ink jet recording material of the present invention, the outermost ink fixing layer is formed by a cast-coating procedure. In the cast-coating procedure, a coating liquid layer is dried on a specular surface of a casting drum (a metal drum, a plastic resin drum or a glass drum) or of a metal plate, plastic resin sheet or film, under pressure to form a coating layer having a smooth and glossy surface transferred from the specular surface of the casting drum plate, sheet or film.

In the procedure for forming a cast-coated layer by using a specular casting drum, a coating composition (liquid) is coated on a surface of an intermediate ink fixing layer, and the coating composition layer is pressed onto a heated specular surface of the casting drum while the coating composition layer is kept in wetted condition, under pressure, and dried. This method is referred to as a wet casting method. Alternatively, a coating composition (liquid) is coated on a surface of the intermediate ink fixing layer, is dried and rewetted with water, and then the rewetted coating composition layer is pressed onto the heated specular surface of the casting drum under pressure, and dried. This method is referred to as a re-wet casting method.

The cast-coating procedure can be carried out by directly coating a heated specular casting surface of a casting drum with a cast-coating composition, and then, the resultant cast-coating composition layer is pressed onto the intermediate ink fixing layer surface on the substrate material under pressure, and dried. This method is referred to as a pre-casting method.

The heated specular surface of the casting drum preferably has a temperature of 40 to 200° C., more preferably 70 to 150° C. When the specular surface temperature is less than 40° C., a long time may be required to complete the drying of the cast-coated layer, the resultant cast-coated layer surface may exhibit an unsatisfactory gloss, and the producibility of the outermost ink fixing layer may be significantly low. When the cast-coating temperature is more than 200° C., the surface of the resultant cast-coated layer may be rough and may exhibit an unsatisfactory gloss.

In the cast-coating procedures in which a cast-coating composition for the outermost ink fixing layer is coated on an intermediate ink fixing layer, the coating composition layer is pressed onto a heated specular surface of a casting drum under pressure, while the coating composition is kept in a wetted condition, and dried on the specular surface, a procedure for promoting a non-mobility of the coating composition may be applied to the coating composition to restrict the penetration of the coating composition into the intermediate ink fixing layer. For this procedure, (1) a gelatinizing agent is contained in the intermediate ink fixing layer to promote the non-mobility of the cast-coating composition for the outermost ink fixing layer; (2) a gelatinizing agent is coated on or impregnated in the intermediate ink fixing layer to promote the non-mobility of the cast-coating composition for the outermost ink fixing layer; (3) after the cast-coating composition for the undermost ink fixing layer is coated, a gelatinizing agent for promoting the non-mobility of the coating composition is coated on or impregnated in the coating composition layer; or (4) in the preparation of the cast coating composition for the outermost ink fixing layer, a gelatinizing agent capable of promoting the non-mobility of the cast-coating composition in the drying step for the cast-coating composition layer is added to the cast-coating composition.

As a gelatinizing agent for the cast-coating composition, boric acid, formic acid, salts of these acids, aldehyde compounds and epoxy compounds which serve as cross-linking agents for the binder, can be employed.

In the above-mentioned cast-coating methods, when the wet casting method is used, keeping the time between the coating of the cast-coating composition and the start of drying the cast-coating composition layer pressed onto the heated specular casting surface as short as possible contributes to preventing or restricting the penetration of the cast-coating composition into the intermediate ink fixing layer and to enhancing the gloss. Also, a procedure in which, immediately before the intermediate ink fixing layer comes into contact with the specular casting surface, the cast-coating composition is applied between a gap between the intermediate ink fixing layer and the specular casting surface, and the cast-coating composition stream is immediately pressed between the intermediate ink fixing layer surface and to specular casting surface, which procedure is referred to as a nip-casting method, is particularly preferred to significantly restrict the penetration of the cast-coating composition into the intermediate ink fixing layer and to obtain an outermost ink fixing layer, having a high gloss, capable of fixing ink images with a high color density.

The each individual ink fixing layer optionally contains an additive comprising at least one member selected from pigments, anti-foaming agent, coloring materials, fluorescent brightening agents, anti-static agents, preservatives, dispersing agents and thickening agents which are usable for conventional coated paper sheets for printing and the conventional ink jet recording sheets, to control the whiteness, viscosity and the fluidity of the coating composition.

Also, the cast-coating composition for the outermost ink fixing layer preferably contains a release agent to improve the release property of the dried cast-coated layer from the specular casting surface.

The release agent comprises at least one member selected from, for example, higher fatty acid amides, for example, stearic acid amide and oleic acid amide; polyolefin waxes, for example, polyethylene waxes, oxidized polyethylene waxes and polypropylene waxes; higher fatty acid salts, for example, calcium stearate, zinc stearates, potassium oleate and ammonium oleate; lecithin; silicone compounds, for example, silicone oils and silicone waxes and fluorine compounds, for example, polytetra fluoroethylene. In the case where the outermost ink fixing layer contains a cationic compound, the release agent is preferably cationic.

The release agent is preferably contained in an amount of 0.1 to 50 parts by weight, more preferably 0.3 to 30 parts by weight, still more preferably 0.5 to 20 parts by weight, per 100 parts by weight of the pigment. If the content of the release agent is too low, the release property-improving effect may be insufficient, and if the release agent content is too high, the resultant cast-coated outermost ink fixing layer may exhibit an unsatisfactory gloss and too high a ink-repellent property and the fixed ink images may have a unsatisfactory color density.

The outermost ink fixing layer is preferably formed in a dry solid weight of 0.1 to 20 g/m$^2$, more preferably 0.2 to 10 g/m$^2$, still more preferably 0.5 to 5 g/m$^2$. If the dry solid weight is less than 0.1 g/m$^2$, a satisfactory gloss of the ink jet recording material may not be obtained and, if it is more than 20 g/m$^2$, the ink images received on the resultant outermost ink fixing agent may exhibit an unsatisfactory resistance to blotting and the fixed ink images may exhibit an unsatisfactory color density.

The outermost ink fixing layer formed by the specular surface-cast-coating method is optionally further smoothed by a super calender treatment.

To provide a photograph-printing paper sheet-like appearance on the ink jet recording material of the present invention, the 75° specular gloss of the surface of the outermost ink fixing layer determined in accordance with Japanese Industrial standard (JIS) P8142 is preferably 30% or more, more preferably 40% or more, still more preferably 50% or more, further preferably 65% or more.

EXAMPLES

The present invention will be further illustrated by the following examples which are merely representative and the scope of the present invention is not intended to be restricted by the examples in any way.

For the Examples 1 to 7 and Comparative Examples 1 to 7 a substrate paper sheet, and fine silica particles and a mixture of fine silica particles with a cationic compounds were prepared by the procedures as shown below.

(1) Preparation of a Substrate Paper Sheet

An aqueous pulp slurry containing 100 parts by weight of a wood pulp (LBKP, CSF; 400 ml), 5 parts by weight of calcined kaolin having an oil absorption of 80 ml/100 g and an average particle size of 2 μm (trademark: ANSILEX, made by ENGELHARD MINERALS), 0.05 part of a rosin size, 1.5 parts by weight of aluminum sulfate, 0.5 part by weight of a wet strength agent comprising a water-soluble polyamide-epichlorohydrin resin and 0.75 part by weight of starch was subjected to a paper forming procedure using a wire paper machine, to produce a paper sheets having a base weight of 140 g/m$^2$. The resultant substrate paper sheet had a stöckigt sizing degree of 10 seconds and a thickness of 180 μm.

(2) Preparation of Fine Silica Particles

Fine Silica Particles A

An aqueous dispersion of synthetic amorphous silica particles having an average secondary particle size of 4.5 μm and an average primary particle size of 15 nm (traedemark: FINESIL X-45, made by TOKUYAMA K.K.) was subjected to repeated pulverizing procedures using a pressure type homogenizer (model: superpressure type homogenizer GM-1, made by SMT K.K.) under a pressure of 49.0 MPa (500 kg/cm$^2$). The resultant aqueous dispersion contained the pulverized silica particles having a decreased average secondary particle size of 50 nm and an unchanged average primary particle size of 15 nm, and had a solid content of 12%.

Fine Silica Particles B

An aqueous dispersion of synthetic amorphous silica particles having an average secondary particle size of 3.0 μm and an average primary particle size of 11 nm (traedemark: NIPSIL HD-2, made by NIPPON SILICA KOGYO K.K.) was subjected to repeated pulverizing procedures using a pressure type homogenizer (model: superpressure type homogenizer GM-1, made by SMT K.K.) under a pressure of 49.0 MPa (500 kg/cm$^2$). The resultant aqueous dispersion contained the pulverized silica particles having a decreased average secondary particle size of 200 nm and an unchanged average primary particle size of 11 nm, and had a solid content of 12%.

Fine Silica Particles C

An aqueous dispersion of synthetic amorphous silica particles having an average secondary particle size of 9 μm and an average primary particle size of 16 nm (traedemark: NIPSIL LP, made by NIPPON SILICA KOGYO K.K.) was subjected to repeated pulverizing procedures using a pressure type homogenizer (model: superpressure type homogenizer GM-1, made by SMT K.K.) under a pressure of 49.0 MPa (500 kg/cm$^2$). The resultant aqueous dispersion contained the pulverized silica particles having a decreased average secondary particle size of 600 nm and an unchanged average primary particle size of 16 nm, and had a solid content of 12%.

(3) Mixing of Fine Silica Particles with a Cationic Compound

In each of the examples and comparative Examples, the fine silica particles A, B or C were mixed with a cationic compound by the following procedures.

The fine silica particle containing aqueous dispersion was mixed with the cationic compounds. In the resultant mixture, the silica particles were agglomerated to increase the viscosity of the aqueous dispersion. The aqueous dispersion was subjected to a pulverizing procedure using a pressure type homogenizer (model: superpressure type homogenizer GM-1, made by SMT K.K.) under a pressure of 49.0 MPa (500 kg/cm$^2$) to such an extent that the average particle size of the agglomerated silica secondary particles is reduced to the original average secondary particle size. It was confirmed that during the above-mentioned procedures, no change in the average primary particle size of the silica particles occurred.

Example 1

A coating composition for an undercoat layer having a dry solid content of 20% by weight was prepared in the following composition.

Coating Composition for Undercoat Layer (Dry solid content: 20% by weight)

| Component | Part by weight |
|---|---|
| Synthetic amorphous silica (trademark: FINESIL X-60, made by TOKUYAMA K.K.), average secondary particle size: 6.0 μm average primary particle size: 15 nm | 80 |
| Zeolite: (trademark: TOYOBUILDER, made by TOSO K.K.), average particle size: 1.5 μm | 20 |
| Silyl-modified polyvinyl alcohol (trademark: R1130, made by KURARAY K.K.) | 20 |
| Aqueous emulsion of complex of styrene-2-methylhexyl acrylate | 40 |

-continued

| (Dry solid content: 20% by weight) | |
|---|---|
| Component | Part by weight |
| copolymer having a glass transition temperature of 75° C. with colloidal silica having an average particle size of 30 nm, in a weight ratio of the copolymer to the colloidal silica of 40:60, and an average size of emulsified particles of 80 nm | |
| Fluorescent brightening agent (trademark: WHITEX BPSH, made by SUMITOMO KAGAKUKOGYO K.K.) | 2 |

The above-mentioned coating composition was coated on a surface of the substrate paper sheet by using an air knife coater and dried to form an undercoat layer having a dry solid weight of 15 $g/m^2$.

A coating composition having a solid content of 13% by weight for an intermediate ink fixing layer was prepared in the following composition.

Coating Composition for Intermediate Ink Fixing Layer

| (Dry solid content: 13% by weight) | |
|---|---|
| Component | Part by weight |
| Fine silica particles A | 100 |
| Diallyldimethylammonium chloride-acrylamide copolymer (Cationic compound, trademark: PAS-J-81, made by NITTO BOSEKI K.K.) | 10 |
| Cationic aqueous polyetherpolyurethane resin (trademark: F-8564D, made by DAIICHI KOGYOSEIYAKU K.K., Tg = 70° C.) | 20 |

Also, a coating composition having a dry solid content of 10% by weight for an outermost ink fixing layer was prepared in the following composition.

Coating Composition for Outermost Ink Fixing Layer

| (Dry solid content: 10% by weight) | |
|---|---|
| Component | Part by weight |
| Fine silica particles A | 100 |
| Diallylmethylammonium chloride-acrylamide copolymer (cationic compound, trademark: PAS-J-81, made by NITTO BOSEKI K.K.) | 25 |
| Cationic aqueous polyesterpolyurethane resin (trademark: F-8570D, made by DAIICHI KOGYOSEIYAKU K.K., Tg = 12° C.) | 60 |
| Release agent (Stearic acid amide) | 2 |

The undercoat layer-coated substrate paper sheet was subjected to coating procedures using a cast-coating apparatus equipped with an air knife coater, a drier, a roll coater and a casting drum with a specular casting surface.

The surface of the undercoat layer was coated with the above mentioned coating composition for the intermediate ink fixing layer by using the air knife coater and dried in the drier to form an intermediate ink fixing layer having a dry solid weight of 3 $g/m^2$.

Then, the coating composition for the outermost ink fixing layer was coated on the intermediate ink fixing layer by using the roll coater, and immediately the resultant coating composition layer was pressed onto the specular casting surface of the casting drum heated at a temperature of 100° C. under pressure, and dried to form an outermost ink fixing layer having a dry solid weight of 2 $g/m^2$, and then the dried outermost ink fixing layer was separated from the specular casting surface. The outermost ink fixing layer surface had a high gloss. A high gloss ink jet recording sheet was obtained.

Comparative Example 1

An ink jet recording sheet was produced by the same procedures as in Example 1 with the following exceptions.

The substrate paper sheet was coated by the coating composition for the undercoat layer by using an air knife coater and dried, to form an undercoat layer having a dry solid content of 15 $g/m^2$.

The undercoat layer surface was coated with the same coating composition for the outermost ink fixing layer as in Example 1 by using an air knife coater, and the resultant coating composition layer was semi-dried with cool air flow for 20 seconds, the semi-dried coating composition layer having a water content of 150% by weight was pressed onto a heated specular casting surface of a casting drum at a temperature of 100° C. under pressure and dried, and the dried cast-coated layer was separated from the specular casting surface. The cast-coated layer had a dry solid weight of 5 $g/m^2$ and a high gloss.

A comparative ink jet recording sheet was obtained.

Comparative Example 2

An ink jet recording sheet was produced by the same procedures as in Example 1 with the following exceptions.

The substrate paper sheet was coated by the coating composition for the undercoat layer by using an air knife coater and dried to form an undercoat layer having a dry solid content of 15 $g/m^2$.

The undercoat layer surface was coated with the same coating composition for the intermediate ink fixing layer as in Example 1 by using an air knife coater, and the resultant coating composition layer was semi-dried with a cool air flow for 20 seconds, the semi-dried coating composition layer having a water content of 150% by weight was pressed onto a heated specular casting surface of a casting drum at a temperature of 100° C. under pressure and dried, and the dried cast-coated layer was separated from the specular casting surface. The cast-coated layer had a dry solid weight of 5 $g/m^2$ and a high gloss.

A comparative ink jet recording sheet was obtained.

Comparative Example 3

An ink jet recording sheet was produced by the same procedures as in Example 1 with the following exceptions.

The substrate paper sheet was coated by the coating composition for the undercoat layer by using an air knife coater and dried, to form an undercoat layer having a dry solid content of 15 $g/m^2$.

The undercoat layer surface was coated with the same coating composition for the outermost ink fixing layer as in Example 1 by using a roll coater, and immediately the resultant coating composition layer was pressed onto a heated specular casting surface of a casting drum at a temperature of 120° C. under pressure and dried, and the dried cast-coated layer was separated from the specular casting surface. The cast-coated layer had a dry solid weight of 2 g/$m^2$ and a high gloss.

A comparative ink jet recording sheet was obtained.

Example 2

A high gloss ink jet sheet was produced by the same procedures as in Example 1, except that the casting composition for the undercoat layer was prepared in the following composition.

Coating Composition for Undercoat Layer (Dry solid content: 18% by weight)

| Component | Part by weight |
|---|---|
| Synthetic amorphous silica (trademark: FINESIL X-60, made by TOKUYAMA K.K.) | 80 |
| Zeolite (trademark: TOYOBUILDER, made by TOSO K.K.), average particle | 20 |
| Silyl-modified polyvinyl alcohol (trademark: R1130, made by KURARAY K.K.) | 20 |
| Aqueous emulsion of complex of styrene-2-methylhexyl acrylate copolymer having a glass transition temperature of 75° C. with colloidal silica having an average particle size of 30 nm, in a weight ratio of the copolymer to the colloidal silica of 40:60, and an average size of emulsified particles of 80 nm | 40 |
| Fluorescent brightening agent (trademark: WHITEX BPSH, made by SUMITOMO KAGAKUKOGYO K.K.) | 2 |
| Diallyldimethylammonium chloride-acrylamide copolymer (cationic compound, trademark: PAS-J-81, made by NITTO BOSEKI K.K.) | 10 |

Example 3

A high gloss ink jet sheet was produced by the same procedures as in Example 1, except that in the preparation of each of the coating compositions for the intermediate and outermost ink fixing layers, the fine silica particles A was replaced by the fine silica particle B.

Example 4

A high gloss ink jet recording sheet was produced by the same procedures as in Example 1, except that the coating compositions for the undercoat layer, the intermediate ink fixing layer and the outermost intermediate layer were respectively prepared in the following compositions.

Coating Composition for Undercoat Layer (Dry solid content: 17% by weight)

| Component | Part by weight |
|---|---|
| Synthetic amorphous silica (trademark: FINESIL X-60, made by TOKUYAMA K.K.) average secondary particle size: 6.0 μm average primary particle size: 15 nm | 80 |
| Zeolite (trademark: TOYOBUILDER, made by TOSO K.K.), average particle size: 1.5 μm | 20 |
| Silyl-modified polyvinyl alcohol (trademark: R1130, made by KURARAY K.K.) | 20 |
| Aqueous emulsion of complex of styrene-2-methylhexyl acrylate copolymer having a glass transition temperature of 75° C. with colloidal silica having an average particle size of 30 nm, in a weight ratio of the copolymer to the colloidal silica of 40:60, and an average size of emulsified particles of 80 nm | 40 |
| Fluorescent brightening agent (trademark: WHITEX BPSH, made by SUMITOMO KAGAKUKOGYO K.K.) | 2 |
| Diallyldimethylammonium chloride-acrylamide copolymer (cationic compound, trademark: PAS-J-81, made by NITTO BOSEKI K.K.) | 10 |

Coating composition for Intermediate Ink Fixing Layer (Dry solid content: 13% by weight)

| Component | Part by weight |
|---|---|
| Fine silica particles A | 100 |
| Silyl-modified polyvinyl alcohol (trademark: R1130, made by KURARAY K.K.) | 20 |

Coating Composition for Outermost Ink Fixing Layer (Dry solid content: 10% by weight)

| Component | Part by weight |
|---|---|
| Fine silica particles A | 100 |
| Silyl-modified polyvinyl alcohol (trademark: R1130, made by KURARAY K.K.) | 40 |
| Release agent (Stearic acid amide) | 2 |

Example 5

A high gloss ink jet recording sheet was produced by the same procedures as in Example 1, except that the coating compositions for the undercoat layer was prepared in the following compositions.

Coating Composition for Undercoat Layer

| (Dry solid content: 17% by weight) | |
|---|---|
| Component | Part by weight |
| Synthetic amorphous silica (trademark: FINESIL X-60, made by TOKUYAMA K.K.), average secondary particle size: 6.0 μm average primary particle size: 15 nm | 80 |
| Zeolite (trademark: TOYOBUILDER, made by TOSO K.K.), average particle size: 1.5 μm | 20 |
| Silyl-modified polyvinyl alcohol (trademark: R1130, made by KURARAY K.K.) | 20 |
| Fluorescent brightening agent (trademark: WHITEX BPSH, made by SUMITOMO KAGAKUKOGYO K.K.) | 2 |

Example 6

A high gloss ink jet recording sheet was produced by the same procedures as in Example 1, except that the same coating composition as that for the intermediate ink fixing layer in Example 1 was directly coated on the surface of the substrate paper sheet by using an air knife coater without forming the undercoat layer, and dried. The resultant intermediate ink fixing layer had a dry solid weight of 10 $g/m^2$.

The same coating composition as that for the outermost ink fixing layer in Example 1 was coated on the intermediate ink fixing layer by using a roll coater and immediately the resultant coating composition layer was pressed onto a heated specular coating surface of the casting drum at a temperature of 100° C. under pressure, and dried, and the dried outermost ink fixing layer having a dry solid weight of 2 $g/m^2$ was separated from the specular casing surface.

A high gloss ink jet recording sheet was obtained.

Example 7

A high gloss ink jet sheet was produced by the same procedures as in Example 1 with the following exceptions. In the preparation of each of the coating compositions for the outermost and intermediate ink fixing layers, the fine silica particles A were replaced by the fine silica particles C.

Example 8

A high gloss ink jet recording sheet was produced in the same manner as in Example 1 except that the composite sheet produced in the same manner as in Example was subjected to a gloss-controlling procedure using a mat super calender. The super calender had four rolls including a first roughening roll, a second elastic roll, a third elastic roll and a fourth roughening roll. The first roughening roll surface had a Rmax of 4 to 5 μm and a Rz of 2.5 to 4.0 μm and the fourth roughening roll surface had a Rmax of 6–8 μm and a Rz of 3.5 to 5.0 μm, which Rmax and Rz were measured in accordance with JIS B 0601. The surface treatment was applied twice to the composite sheet under a linear pressure of the rolls of 294.2 N/cm (30 kg/cm) at a roll surface temperature of 30° C.

A gloss-controlled ink jet recording sheet was obtained.

Comparative Example 4

A high gloss ink jet recording sheet was produced by the same procedures as in Example 1 with the following exceptions.

After the undercoat layer was formed on the substrate paper sheet in the same manner as in Example 1, a coating composition for a cast-coated layer having the composition shown below was coated in a dry solid amount of 6 $g/m^2$ on the undercoat layer, and immediately the resultant coating composition layer was pressed onto a heated specular casting surface of a casting drum at a surface temperature of 80° C., and dried, and the dried cast-coated layer was separated from the casting surface. A comparative high gloss ink jet recording sheet was obtained.

Coating Composition for Cast-coated Layer

| (Dry solid content: 25% by weight) | |
|---|---|
| Component | Part by weight |
| Aqueous emulsion of complex of styrene-2-methylhexyl acrylate copolymer having a glass transition temperature of 75° C. with colloidal silica having an average particle size of 30 nm, in a weight ratio of the copolymer to the colloidal silica of 40:60, and an average size of emulsified particles of 80 nm | 100 |
| Thickening and dispersing agent (alkyl vinylether-maleic acid derivative copolymer) | 5 |
| Release agent (Lecithin) | 3 |

Note: The colloidal silica particles were non-agglomerated primary particles.

Comparative Example 5

A high gloss ink jet recording sheet was produced by the same procedures as in Example 1, except that the intermediate and outermost ink fixing layers were omitted.

Namely, the resultant comparative ink jet recording sheet had no ink fixing layer.

Comparative Example 7

The same substrate paper sheet as in Example 1 was employed as an ink jet recording sheet.

The resultant ink jet recording sheets of Examples 1 to 7 and Comparative Examples 1 to 7 were subjected to the following tests.

(1) Ink Jet Recording Property

The recording sheets were printed by using an ink jet printer (model: BJC700J, made by CANON K.K.)

(a) Uniformity of Solid Print

The uniformity in color density of solid print with a cyan-colored ink and a magenta-colored ink superposed on each other formed on the recording sheet was evaluated by the naked eye observation, into the following four classes.

| Class | Uniformity |
|---|---|
| 4 | Color density is uniform. Excellent. |
| 3 | Slight unevenness is found. Good. |

-continued

| Class | Uniformity |
|---|---|
| 2 | Certain unevenness is found. Practical use is slightly difficult. |
| 1 | Uneven. Practical use is difficult. |
| (b) | Ink-drying property |

The drying property of the solid printed cyan-colored and magenta-colored inks superposed on each other formed on the recording sheet was evaluated into the following two classes.

| Class | Ink-drying property |
|---|---|
| 2 | Immediate after printing, no staining is found on the finger touched to the solid print. |
| 1 | Immediate after printing, some staining is found on the finger touched to the solid print. |
| (c) | Color density of ink jet recorded image |

The color density of a black-colored solid print on the recording sheet was measured by using a Macbeth reflection color density tester (model: RD-914).

(2) Gloss

A 75° specular gloss of a non-printed portion of the recording sheet was measured in accordance with JIS P 8142.

(3) Surface Strength

A front surface of a recording sheet was lightly rubbed five times with a back surface thereof, and the degree of damage formed on the front and back surfaces was evaluated into the following three classes.

| Class | Damage |
|---|---|
| 3 | Substantially no damage is found. |
| 2 | Certain damages are found, and practical use is slightly difficult. |
| 1 | Significant damages are found and practical use is difficult. |

(4) Appearance

The appearance of the recording sheet was evaluated, by naked eye observation, into the following four classes.

| Class | Appearance |
|---|---|
| 4 | Excellent |
| 3 | Good |
| 2 | Slightly bad |
| 1 | Bad |

(5) General Evaluation

The general quality of the recording sheet was evaluated in view of the quality of the ink images and gloss and surface strength of the recording sheet, into the following five classes.

| Class | Evaluation |
|---|---|
| 5 | Very excellent |
| 4 | Excellent |
| 3 | Satisfactory |
| 2 | Slightly unsatisfactory |
| 1 | Unsatisfactory |

The test results are shown in Table 1.

TABLE 1

| | Item | | | | | | |
|---|---|---|---|---|---|---|---|
| | Ink jet recording property | | | | | | |
| Example No. | Uniformity of solid print | Ink drying property | Color density of ink images | 75° specular gloss | Surface strength | Appearance | General evaluation |
| Example | | | | | | | |
| 1 | 4 | 2 | 2.4 | 70 | 3 | 4 | 5 |
| 2 | 4 | 2 | 2.0 | 40 | 3 | 3 | 4 |
| 3 | 4 | 2 | 2.2 | 50 | 3 | 3 | 4 |
| 4 | 4 | 2 | 1.9 | 45 | 3 | 3 | 4 |
| 5 | 4 | 2 | 2.2 | 50 | 3 | 4 | 5 |
| 6 | 3 | 2 | 2.2 | 50 | 3 | 3 | 4 |
| 7 | 4 | 2 | 1.9 | 30 | 3 | 2 | 3 |
| 8 | 4 | 2 | 2.3 | 40 | $3(*)_1$ | $3(*)_2$ | $4(*)_3$ |
| Comparative Example | | | | | | | |
| 1 | 2 | 1 | 1.9 | 50 | 3 | 2 | 2 |
| 2 | 4 | 2 | 2.2 | 40 | 1 | 2 | 2 |
| 3 | 2 | 2 | 2.0 | 30 | 1 | 2 | 2 |
| 4 | 4 | 2 | 1.4 | 70 | 3 | 3 | 2 |
| 5 | 2 | 2 | 1.2 | 5 | 3 | 1 | 1 |

TABLE 1-continued

| | Item | | | | | | |
|---|---|---|---|---|---|---|---|
| | Ink jet recording property | | | | | | |
| Example No. | Uniformity of solid print | Ink drying property | Color density of ink images | 75° specular gloss | Surface strength | Appearance | General evaluation |
| 6 | 4 | 2 | 1.5 | 5 | 3 | 1 | 1 |
| 7 | 1 | 2 | 1.0 | 7 | 3 | 1 | 1 |

Note:
$(*)_1$ . . . Very high surface strength
$(*)_2$ . . . Good in semi-gloss appearance
$(*)_3$ . . . Excellent as semi-gloss recording sheet For Examples II-1 to II-5, a substrate paper sheet, and fine silica particles and a mixture of fine silica particles with a cationic compounds were prepared by the procedures as shown below.

(1) Preparation of a Substrate Paper Sheet

An aqueous pulp slurry containing 100 parts by weight of a wood pulp (LBKP, CSF; 400 ml), 5 part by weight of calcined kaolin (trademark: ANSILEX, made by ENGELHARD MINERALS), 0.1 part of a rosin size, 1.5 parts by weight of aluminum sulfate, 0.5 part by weight of a wet strength agent and 0.75 part by weight of starch was subjected to a paper forming procedure using a wire paper machine, to produce a paper sheets having a base weight of 140 $g/m^2$ and an ash content of 5% by weight. The resultant substrate paper sheet had a stöckigt sizing degree of 50 seconds and a thickness of 180 $\mu$m.

(2) Preparation of Fine Silica Particles

Fine Silica Particles A

The same as mentioned hereinbefore.

Fine silica particles B

The same as mentioned hereinbefore.

Fine silica particles C

The same as mentioned hereinbefore.

(3) Mixing of Fine Silica Particles with a Cationic Compound

In each of the examples II-1 to II-5, the fine silica particles A, B or C were mixed with a cationic compound by the following procedures.

The fine silica particle-containing aqueous dispersion was mixed with the cationic compound. In the resultant mixture, the silica particles are agglomerated to increase the viscosity of the aqueous dispersion. The resultant aqueous dispersion was subjected to a pulverizing procedure using a pressure type homogenizer (model: superpressure type homogenizer GM-1, made by SMT K.K.) under a pressure of 49.0 MPa (500 $kg/cm^2$) to such an extent that the average particle size of the agglomerated silica secondary particles is reduced to the original average secondary particle size of. It was confirmed that, during the above-mentioned procedures, no change in the average primary particle size of the silica particles occurred.

Example II-1

A coating composition for an undercoat layer having a dry solid content of 20% by weight was prepared in the following composition.

Coating Composition for Undercoat Layer (Dry solid content: 20% by weight)

| Component | Part by weight |
|---|---|
| Synthetic amorphous silica (trademark: FINESIL X-60, made by TOKUYAMA K.K.), average secondary particle size: 6.0 $\mu$m average primary particle size: 15 nm | 80 |
| Zeolite (trademark: TOYOBUILDER, made by TOSO K.K.), average particle size: 1.5 $\mu$m | 20 |
| Silyl-modified polyvinyl alcohol (trademark: R1130, made by KURARAY K.K.) | 20 |
| Aqueous emulsion of complex of styrene-2-methylhexyl acrylate copolymer having a glass transition temperature of 75° C. with colloidal silica having an average particle size of 30 nm, in a weight ratio of the copolymer to the colloidal silica of 40:60, and an average size of emulsified particles of 80 nm | 40 |
| Fluorescent brightening agent (trademark: WHITEX BPSH, made by SUMITOMO KAGAKUKOGYO K.K.) | 2 |

The above-mentioned coating composition was coated on a surface of the substrate paper sheet having the stöckigt sizing degree of 50 seconds by using an air knife coater and dried to form an undercoat layer having a dry solid weight of 15 $g/m^2$.

A coating composition having a solid content of 13% by weight for an intermediate ink fixing layer was prepared in the following composition.

Coating Composition for Intermediate Ink Fixing Layer (Dry solid content: 13% by weight)

| Component | Part by weight |
|---|---|
| Fine silica particles A | 100 |
| Polyvinyl alcohol (trademark: PVA117, made by KURARAY K.K.) | 15 |

Also, a coating composition having a dry solid content of 10% by weight for an outermost ink fixing layer was prepared in the following composition.

Coating Composition for Outermost Ink Fixing Layer (Dry solid content: 10% by weight)

| Component | Part by weight |
|---|---|
| Fine silica particles A | 100 |
| Diallylmethylammonium chloride-acryamide copolymer (cationic compound, trademark: PAS-J-81, made by NITTO BOSEKI K.K.) | 25 |
| Cationic aqueous polyesterpolyurethane resin Tg-modification product of F-8570D, (trademark), made by DAIICHI KOGYOSEIYAKU K.K., Tg = 50° C. | 60 |
| Release agent (Cationic polyethylene wax emulsion, trademark: PELTOL N-856, made by KINDAI KAGAKUKOGYO K.K.) | 5 |

The surface of the undercoat layer was coated with the above-mentioned coating composition for the intermediate ink fixing layer by using the air knife coater and dried to form an intermediate ink fixing layer having a dry solid weight of 5 g/m$^2$.

Then, the coating composition for the outermost ink fixing layer was coated on the intermediate ink fixing layer by using the roll coater, and immediately the resultant coating composition layer was pressed onto the specular casting surface of the casting drum heated at a temperature of 100° C. under pressure, and dried to form an outermost ink fixing layer having a dry solid weight of 2 g/m$^2$, and then the dried outermost ink fixing layer was separated from the specular casting surface. The outermost ink fixing layer surface had a high gloss. A high gloss ink jet recording sheet was obtained.

Example II-2

A high gloss ink jet recording sheet was produced by the same procedures as in Example II-1, except that in the preparation of the coating compositions for the intermediate ink fixing layer, the fine silica particles A were replaced by the fine silica particles C.

Example II-3

A high gloss ink jet recording sheet was produced by the same procedures as in Example II-1, except that the coating composition for the outermost ink fixing layer was prepared in the following composition.

Coating Composition for Outermost Ink Fixing Layer (Dry solid content: 10% by weight)

| Component | Part by weight |
|---|---|
| Fine silica particles A | 100 |
| Diallylmethylammonium chloride-acryamide copolymer (cationic compound, trademark: PAS-J-81, cation intensity: 2.9 milli equivalent/g, made by NITTO BOSEKI K.K.) | 25 |
| Dicyandiamide-polyethylenepolyamine copolymer (cationic compound, trademark: NEDFIX RP-70, cation intensity: 2.9 milli equivalent/g, made by NIKKA KAGAKU K.K.) | 10 |
| Cationic aqueous polyesterpolyurethane resin Tg-modification product of F-8570D, (trademark), made by DAIICHI KOGYOSEIYAKU K.K., Tg = 50° C. | 60 |
| Release agent (polyethylene wax emulsion) | 5 |

The fine silica particles and the cationic compound were mixed with each other by the same procedures as mentioned above, except that, first, 100 parts by weight of the five silica particles A were mixed with 10 parts by weight of the cationic compound PAS-J-81 (trademark), and then the resultant mixture was further mixed with the remaining cationic components.

Example II-4

A high gloss ink jet recording sheet was produced by the same procedures as in Example II-1, except that the coating composition for the intermediate ink fixing layer was prepared in the following composition.

Coating Composition for Intermediate Ink Fixing Layer (Dry solid content: 13% by weight)

| Component | Part by weight |
|---|---|
| Fine silica particles A | 100 |
| Diallylmethylammonium chloride-acryamide copolymer (cationic compound, trademark: PAS-J-81, made by NITTO BOSEKI K.K.) | 15 |
| Polyvinyl alcohol (trademark: PVA117, made by KURARAY K.K.) | 15 |

In the preparation of the coating composition for the outermost ink fixing layer, the fine silica particles were mixed with the cationic components in the same procedures as mentioned above, except that, first, 100 parts by weight of the fine silica particles A were mixed with 10 parts by weight of the cationic compound PAS-J-81 (trademark), and then the resultant mixture was further mixed with the remaining cationic components.

Example II-5

A high gloss ink jet recording sheet was produced by the same procedures as in Example II-1, except that the coating composition for the outermost ink fixing layer was prepared in the following composition.

Coating Composition for Outermost Ink Fixing Layer

| (Dry solid content: 10% by weight) | |
|---|---|
| Component | Part by weight |
| Fine silica particles A | 100 |
| Diallylmethylammonium chloride-acryamide copolymer (cationic compound, trademark: PAS-J-81, cation intensity: 5.9 milli equivalent, made by NITTO BOSEKI K.K.) | 10 |
| Polyallylamine (trademark: PAA-HC1-3L, made by NITTO BOSEKI K.K.) | 5 |
| Diaryldimethyl ammonium chloride (trademark: UNISENCE CP91, made by SENKA K.K.) | 15 |
| Cationic aqueous polyesterpolyurethane resin Tg-modified product of F-8570D, (trademark), Tg = 50° C., made by DAIICHI KOGYOSEIYAKU K.K., Tg = 12° C.) | 60 |
| Release agent (Polyethylene wax emulsion | 5 |

The fine silica particles were mixed with the cationic components in the same mixing manner as mentioned above, except that first 100 parts by weight of the fine silica particles were mixed with 10 parts by weight of the cationic compound PAS-J-81 (trademark), and then mixed with the remaining cationic compounds.

The resultant ink jet recording sheets of Examples II-1 to 5 were subjected to the following tests.

(1) Ink Jet Recording Property

The recording sheets were printed by using an ink jet printer (model: BJC700J, made by CANON K.K.)

(a) Uniformity of Solid Print

The uniformity in color density of solid print with a cyan-colored ink and a magenta-colored ink superposed on each other formed on the recording sheet was evaluated by the naked eye observation, into the following four classes.

| Class | Uniformity |
|---|---|
| 3 | Color density is uniform. Excellent. |
| 2 | Certain unevenness is found. Practical use is slightly difficult. |
| 1 | Uneven. Practical use was difficult. |
| (b) | Ink-drying property |

(b) Ink-drying Property

The drying property of the solid printed cyan-colored and magenta-colored inks superposed on each other formed on the recording sheet was evaluated into the following two classes.

| Class | Ink-drying property |
|---|---|
| 2 | Immediate after printing, no stain is found on a finger touched to the solid print. |
| 1 | Immediate after printing, some staining is found on a finger touched to the solid print. |
| (c) | Color density of ink jet recorded image |

-continued (c) Color Density of Ink Jet Recorded Image

The color density of a black-colored solid print on the recording sheet was measured by using a Macbeth reflection color density tester (model: RD-914).

(2) Gloss

A 75° specular gloss of non-printed portion of the recording sheet was measured in accordance with JIS P 8142.

(3) Surface Strength

A front surface of a recording sheet was lightly rubbed five times with a back surface thereof, and the degree of damage formed on the front and back surfaces was evaluated into the following three classes.

| Class | Damage |
|---|---|
| 3 | Substantially no damage was found. |
| 2 | Some damage is found, and practical use is slightly difficult. |
| 1 | Significant damages was found and practical use is difficult. |

(4) Appearance

The appearance of the recording sheet was evaluated by the naked eye observation into the following four classes.

| Class | Appearance |
|---|---|
| 4 | Excellent |
| 3 | Good |
| 2 | Slightly bad |
| 1 | Bad |

(5) Water Resistance

A droplet of water was dropped on a surface of ink image-fixed portion of a printed recording sheet, and the wetted recording sheet was dried. The resistance of the ink images to blotting was evaluated by the naked eye into the following four classes.

| Class | Resistance to blotting |
|---|---|
| 4 | Excellent |
| 3 | Good |
| 2 | Slightly unsatisfactory |
| 1 | Bad |

(6) General Evaluation

The general quality of the recording sheet was evaluated in view of the quality of the ink images and gloss and surface strength of the recording sheet, into the following five classes.

| Class | Evaluation |
|---|---|
| 5 | Very excellent |
| 4 | Excellent |
| 3 | Satisfactory |
| 2 | Slightly unsatisfactory |
| 1 | Unsatisfactory |

The test results are shown in Table 2.

TABLE 2

| Example No. | Item: Ink jet recording property: Uniformity of solid print | Ink drying property | Color density of ink images | 75° specular gloss | Surface strength | Appearance | Water resistance | General evaluation |
|---|---|---|---|---|---|---|---|---|
| Example | | | | | | | | |
| II-1 | 3 | 2 | 2.4 | 70 | 3 | 4 | 3 | 5 |
| II-2 | 3 | 2 | 2.0 | 55 | 3 | 3 | 3 | 4 |
| II-3 | 3 | 2 | 2.2 | 60 | 3 | 3 | 4 | 5 |
| II-4 | 3 | 2 | 1.8 | 60 | 3 | 3 | 4 | 4 |
| II-5 | 3 | 2 | 2.4 | 70 | 3 | 4 | 4 | 5 |

The ink jet recording material of the present invention exhibits an excellent ink drying property, appearance, and gloss and can record thereon ink images having high color density, clarity and uniformity even in a solid print. Also, the process of the present invention is useful for producing an ink jet recording material having an excellent ink drying property, appearance, and gloss and can record thereon ink images having high color density, clarity and uniformity even in solid print, at a high production rate with high productivity.

What is claimed is:

1. An ink jet recording material comprising a substrate material, at least one undercoat layer formed on a surface of the substrate material, and a multi-layered ink fixing layer composed of one or more intermediate ink fixing layers formed on a surface of the undercoat layer and a outermost ink fixing layer superposed on the intermediate ink fixing layers, each of the outermost and intermediate ink fixing layers comprising a pigment comprising at least one member selected from the group consisting of a silica, alumina silicate, alumina and zeolite, and a binder, wherein, (1) the undercoat layer comprises a pigment in the form of secondary particles having a secondary particle size of 1 to 20 μm, a binder and a complex of a polymer of at least one monomer having at least one ethylenically unsaturated bond with colloidal silica;

(2) the pigment contained in each of the outermost and intermediate ink fixing layers is in the form of fine secondary particles having an average secondary particle side of 10 to 500 nm and each secondary particle is composed of a plurality of primary particles having an average primary particle size of 3 to 40 nm and agglomerated with each other to form a secondary particle;

(3) the outermost ink fixing layer further contains a cationic compound, and the intermediate ink fixing layer does not contain a cationic compound;

(4) the cationic compound for the outermost ink fixing layer is selected from cationic polymethane resins having a glass transition temperature of −20 to 150° C.;

(5) the outermost ink fixing layer further contains a release agent;

(6) the outermost ink fixing layer is one formed by a cast-coating procedure, and (7) the surface of the outermost ink fixing layer has a gloss at a specular angle of 75 degrees of 30% or more, determined in accordance with JIS P 8142.

2. The ink jet recording material as claimed in claim 1, wherein the pigment contained in each ink fixing layer is silica.

3. The ink jet recording material as claimed in claim 1, wherein a cationic compound having one or more cationic groups per molecule is further contained in at least the outermost ink fixing layer of the multi-layered ink fixing layer.

4. The ink jet recording material as claimed in claim 1, wherein the cast-coating procedure for forming the outermost ink fixing layer is carried out by bringing a layer of a coating composition for the outermost ink fixing layer into contact with a heated specular surface of a casting drum under pressure, while the coating composition layer is kept in a wetted condition, and drying the coating composition layer on the heated specular surface of the casting drum.

5. The ink jet recording material as claimed in claim 1, wherein the pigment for the undercoat layer comprises at least one member selected from the group consisting of amorphous silica, alumina and zeolite.

6. The ink jet recording material as claimed in claim 1, wherein, in the multi-layered ink fixing layer, the binder and the pigment are present in a weight ratio of 5:100 to 100:100 in terms of binder to pigment.

7. The ink jet recording material as claimed in claim 1, wherein, in the multi-layered ink fixing layer, the outermost ink fixing layer contains the binder in a higher proportion, based on the amount of the pigment, than that in the intermediate ink fixing layers.

8. A process for producing the ink jet recording material of claim 1, comprising coating a surface of a substrate material with a multi-layered ink fixing layer composed of an outermost ink fixing layer and one or more intermediate ink fixing layers superposed on each other and each comprising a pigment comprising at least one member selected from the group consisting of silica, aluminosilicate, alumina and zeolite, and a binder, wherein the pigment for the multi-layered ink fixing layer is in the form of fine secondary particles having an average secondary particle size of 1 μm or less and each secondary particle is composed of a plurality of primary particles agglomerated with each other to form a secondary particle, and the outermost ink fixing layer located outermost of the multi-layered ink fixing layer is formed by a cast-coating procedure wherein a layer of a coating composition for the outermost ink fixing layer is brought into contact with a heated specular surface of a casting drum under pressure, while the coating composition layer is kept in a wetted condition, and drying the coating composition layer pressed on the heated specular surface of the casting drum.

* * * * *